United States Patent
Duart Álvarez De Cienfuegos

(10) Patent No.: US 8,573,466 B2
(45) Date of Patent: Nov. 5, 2013

(54) MOLD CRUCIBLE SYSTEM FOR CONNECTING TUBES AND CABLES AND METHOD THEREOF

(71) Applicant: KLK Electro Materiales, S.A., Gijon (ES)

(72) Inventor: Daniel Duart Álvarez De Cienfuegos, Gijon (ES)

(73) Assignee: KLK Electro Materiales S.L.U., Gijon (ES)

(*) Notice: Subject to any disclaimer, the term of this patent is extended or adjusted under 35 U.S.C. 154(b) by 0 days.

(21) Appl. No.: 13/625,306

(22) Filed: Sep. 24, 2012

(65) Prior Publication Data

US 2013/0105560 A1 May 2, 2013

(30) Foreign Application Priority Data

Sep. 23, 2011 (ES) .................................. 201131538

(51) Int. Cl.
| | | |
|---|---|---|
| *B23K 37/00* | (2006.01) | |
| *B23K 31/02* | (2006.01) | |
| *C21B 15/00* | (2006.01) | |
| *B22D 41/00* | (2006.01) | |

(52) U.S. Cl.
USPC  228/44.7; 228/234.3; 266/167; 164/DIG. 12; 164/335

(58) Field of Classification Search
USPC ........... 228/44.7, 44.3, 234.3, 33; 164/53, 54, 164/335, 271, DIG. 12; 266/167; 249/91, 249/106, 197, 86, 83
See application file for complete search history.

(56) References Cited

U.S. PATENT DOCUMENTS

| | | | | |
|---|---|---|---|---|
| 2,387,715 | A * | 10/1945 | Cadwell | 75/641 |
| 3,022,554 | A * | 2/1962 | Burke | 249/91 |
| 3,262,163 | A * | 7/1966 | Gelfand | 164/54 |
| 4,062,485 | A * | 12/1977 | Andersen | 228/56.3 |
| 5,279,455 | A * | 1/1994 | Fuchs | 228/234.3 |
| 5,533,662 | A * | 7/1996 | Stidham et al. | 228/33 |
| 5,538,174 | A * | 7/1996 | Gaman | 228/44.7 |
| 5,653,279 | A * | 8/1997 | Foutz et al. | 164/54 |
| 6,317,971 | B1 * | 11/2001 | Colarusso et al. | 29/825 |
| 6,382,496 | B1 * | 5/2002 | Harger | 228/44.3 |
| 6,776,386 | B1 * | 8/2004 | Morrissey et al. | 249/97 |
| 6,789,724 | B2 * | 9/2004 | Cordier et al. | 228/234.3 |
| 6,835,910 | B2 * | 12/2004 | Moore et al. | 219/121.45 |
| 6,994,244 | B2 * | 2/2006 | Harger et al. | 228/234.3 |

FOREIGN PATENT DOCUMENTS

| | | |
|---|---|---|
| ES | 1005251 U | 11/1988 |
| ES | 201030202 | 12/2010 |
| ES | 2356649 A1 | 4/2011 |

\* cited by examiner

*Primary Examiner* — Kiley Stoner
*Assistant Examiner* — Carlos Samino
(74) *Attorney, Agent, or Firm* — Blank Rome LLP

(57) ABSTRACT

A new anchoring mechanism for the mold-crucible set to the tube, to which the cable is to be welded is described, and the inclusion and use of some bushings which are inserted between the cable and the mold.

15 Claims, 8 Drawing Sheets

MOLD CRUCIBLE SYSTEM FOR CONNECTING TUBES AND CABLES AND METHOD THEREOF

This application claims priority to Spanish Patent Application No. P201131538, filed Sep. 23, 2011.

OBJECT OF THE INVENTION

The present invention refers to a system and a process of connection though welding to make electric connections between conductive cables of different sections and the surface of steel tubes of different diameters.

The object of the invention allows making electric connections between conductive cables of different sections and the surface of steel tubes of different diameters, without the temperature of the tube's surface exceeding a predetermined value.

BACKGROUND OF THE INVENTION

When it is desirable to implement cathodic protection in tubes conducting gas in their interior, it is necessary to weld a cable with a certain section to the exterior surface of the tube. This cable will itself be connected to a sacrificial anode.

The welding process to make electric connections between the conductive cables and the surface of the tubes must guarantee that the surface temperature of the tubes does not exceed a certain value. If this value is lower than 721° C., it ensures that there is no phase change in the steel's internal structure thus ruling out, during the cooling subsequent to the performance of welding, the appearance of contraction cracks, internal defects, no-balance structures, etc. This way, the internal structure of the steel is kept "healthy", thus preventing its weakening. Furthermore, the lower the temperature that the tube reaches, the lower the risk of inflammation of the volatile components associated with the gas pipeline.

The utility model U8702866, from KLK Electro Materiales S. A., describes a mold-crucible set for the connection of electric cables over the steel surfaces, especially train rail tracks. Described in this document is a welding process by aluminothermic, but eliminating the possibility of structural changes in the steel due to the thermal shock produced during welding. To that end, a small metal plate is placed between the cable and the area where the welding is to be made, which incorporates, on the side in contact with the steel surface, an alloy with a fusion point lower than the temperature at which the structural changes in the steel occur. The heat produced by the aluminothermic reaction will melt the low fusion point alloy which will be able to weld, simultaneously, the aforementioned metal plate and the connection cable to the other part of the plate. The upper part of the mold-crucible set contains the reaction chamber and the lower part that separates the welding chamber has an input for the cable in said chamber and an anchor for the previously described plate. This plate is attached to the rail through a fitting system that features a strip.

On the other hand, KLK Electro Materiales, S. A., has requested a Spanish patent with application number P200803232 with the title "Lid for graphite mold in aluminothermic welding". Described in this application is a "labyrinth lid" that serves the function of evacuating the gasses of the reaction, but which retains all of the solid particles (projections) inside the mold. This is possible due to some channels inside the lid itself that force the gasses to first circulate backwards and then forward, always with sharp changes in direction. This way, the flow of gasses is weakened and the particles that could be dragged by the gasses are fully retained. The lid is actually formed by two parts, an upper and a lower one, that are interconnected by a hinge and spring mechanism placed on one of its ends and which, in turn, are connected to the mold through a hinge located in other of its ends.

Subsequently, KLK Electro Materiales, S. A., has made a request for a Spanish patent with application number P201030202, whose object of the invention is the same as the object of the invention in this application, i.e., a process that allows making electric connections between conductive cables of different sections and the surface of steel tubes of different diameters, without the temperature of the tube's surface exceeding a predetermined value.

In patent application P201030202, cited in the above paragraph, an anchoring mechanism of the mold-crucible to the surface of the tube is described, which incorporates a series of components, such as anchoring elements, hinges, pushers, guide bushings, handle, magnets, flanges, etc. In short, in that application, the anchoring mechanism is presented as a complex set, independent of the mold, and which, as opposed to the mold that is disposable, it is usable in several different welding operations. However, occasionally it might be more interesting to use a single-use anchoring system, i.e. one that is consumable.

On the other hand, in application P201030202, a mold-crucible is presented with an adequately-sized opening to insert a certain section cable through it. To perform welding on a cable with a different section, it is necessary to choose a different mold-crucible, i.e., with an appropriately sized opening for the section of the new cable. However, it may be very interesting to have a system that allows for the use of the same mold-crucible for cables with different sections.

DESCRIPTION OF THE INVENTION

The system and process of welding object of the invention, like the object of the invention in patent application P201030202, enables to make electric connections between conductive cables of different sections and the surface of steel tubes of different diameters, without the temperature of the tube's surface exceeding a predetermined value. Both have similarities with what was described in the aforementioned utility model, U8702866 since it takes advantage of the heat that is generated in the aluminothermic reaction and it eliminates the possibility of structural changes in the steel, given that they allow for the placement of a small plate between the cable and the area where the welding is to be made. This plate incorporates, on the side in contact with the steel surface, the alloy with a low fusion point. Like in the case above, the heat produced by the aluminothermic reaction will melt the low fusion point alloy so that it will be possible to weld, simultaneously, the aforementioned steel plate and the connection cable to the other side of the plate.

The mold-crucible set may be divided into an upper part, adapted to contain the reaction chamber, and a lower part, adapted to separate the welding chamber which also has an input for the cable in said chamber and an anchor for the plate which incorporates the low fusion point alloy that was previously described.

The main difference between the model viewed in the aforementioned utility model and the systems and processes that are described both in application P201030202 and in this application is that, while in the former the cable connection is made over a flat surface which is accessible from one side (rail skid), in the latter the surface is curved (gas tube). The first consequence from this difference is that the anchoring mechanism is very different in one case and the other.

The first difference between the system and process that are described in patent application P201030202 and the system and process object of this application has to do with the anchoring system of the mold to the tube. While in application P201030202 the anchoring system is presented as an element separated from the mold, and which may have multiple uses, in the current application the anchoring system is presented as an element that is incorporated on to the mold itself, being a simpler anchoring system than the one described in that patent application, which is incorporated on to the mold-crucible and is regarded, such as the mold-crucible itself, as a single-use element, i.e., consumable.

On the one hand, economically, it is more advantageous when the number of welding to be made is reduced, since it is not necessary to carry out the investment in the anchoring system as described in application P201030202. The fact that, being fully consumable, there are no required maintenance operations on any component might also be an advantage.

It is worth mentioning that the new anchoring system is still valid for any tube diameter, so that a single welding kit continues to enable welding of tubes of any diameter. At the same time, it is worth mentioning that the new anchoring system does not incorporate any clamping element to the tube, so that it is not necessary to fully unearth the tube in its full diameter to allow passage to that clamping element, so it is only necessary to uncover the upper part of the tube in which the welding is to be made.

The system for connecting cables and tubes object of the invention is characterized in that it comprises:
  an anchoring mechanism adapted to be attached to the surface of the tube which comprises a fixed piece anchored to the mold-crucible set and a piece that is mobile longitudinally with respect to the mold-crucible set, which is located on the lower part of said set and in whose lower part there is at least one magnet placed, adapted for the creation of a magnetic field to generate a connection force between the tube's surface and the anchoring system,
  at least a traction spring that extends between the fixed piece and the mobile piece.

Therefore, the new anchoring system incorporates a fixed piece that may be preferably anchored to the upper part of the mold-crucible. It further incorporates a piece that is mobile with respect to the mold-crucible and which will be located under the fixed piece. Both pieces are interconnected through at least one traction spring, for example two traction springs, located in opposing positions with respect to the mold crucible. Finally, on the lower part of the mobile piece there is at least one magnet, preferably two small magnets, also located in opposing positions with respect to the mold-crucible.

During the execution of the connection process, the mobile piece may be displaced from its first position in order to move it closer to the tube's surface to which the mold-crucible is to be attached. This descending movement has two consequences. On the one hand, the elongation of the springs increases. On the other hand, the two magnets move closer to the surface of the tube. When the two magnets are finally close enough to the surface of the tube, the magnetic field created by said magnets causes them to be firmly connected to that surface. Furthermore, in this situation, the springs are fully tractioned, transmitting their traction strength from the mobile piece to the fixed piece, with the latter itself transmitting it to the mold-crucible, which for this reason remains held tight against the surface of the tube and through the plate that has the low fusion point alloy incorporated. This tightening force between the plate and the surface is necessary for the capillarity phenomena to occur, which ultimately constitute the connection between both elements.

The magnets of the anchoring mechanisms are placed in such a way that they are adapted to be placed aligned with respect to the tube's contour, this way when the anchoring mechanism is neared to the tube, it will be done in a way that these two magnets are aligned with the profile of the tube. Independently of the tube's diameter, it will be only along the tube profile that the connection between the anchoring mechanism and the tube itself takes place. This is the reason why the anchoring mechanism is valid no matter the diameter of the tube.

It is important that the strength of the magnets is sufficiently large to counteract the reaction force that is made by the mold-crucible set against the anchoring elements. Otherwise, this reaction force would be enough to separate the anchoring mechanism from the surface of the tube, rendering it inefficient.

The system object of the present invention features a second difference with respect to patent application P201030202 which has to do with the opening for the input of the cable into the mold-crucible. In that application, the mold-crucible is featured with an opening appropriately sized to introduce a cable with a certain section through it. To perform welding on a cable having a different section it is necessary to choose a different mold-crucible, i.e., with an appropriately sized opening for the new section of the cable. Presented in the current application are a series of bushings complementary to the opening of the mold-crucible, which may modify the latter's size, and thus enable the use of the same mold-crucible with cables of different sections.

At least one of the bushings complementary to the opening of the mold-crucible is the one incorporated by the mold-crucible itself through which, either the cable with the larger section that may be welded with the system described herein or the complementary bushing corresponding to another section of cable will be welded, if that other section of cable needs to be welded.

The bushing incorporated in the mold-crucible has a conical inner surface. The conicity of this surface is equal to the conicity of the exterior surface of the complementary bushing corresponding to another section of the cable. For this reason, when the second bushing is introduced into the first, it will be enough to lightly push to obtain a conical adjustment between both surfaces, which will guarantee the connection between the two bushings due to the strong friction force that will appear. For this reason, the lack of clearance between both bushings will be guaranteed, ensuring that there will be no leaks of molten metal from the aluminothermic reaction.

While the assembly of the bushes enables to make the welding of a cable smaller that the cable with a higher section that may be welded with the kit, the total section of the cable plus the bushings will not suffer much modification from one case to another. Indeed, in all cases the opening of the mold-crucible will be occupied almost entirely by copper, either from the bushings or from the cable. For this reason, the aluminothermic charge may always be the same, independently of the section of the cable to be welded.

Finally, another difference between the system and process described in patent application P201030202 and the system and process object of this application has to do with the lid that may be placed on the upper part of the mold. In application P201030202, the lid formed by two different pieces is introduced. In the current application, the lid formed by two pieces is still introduced, but incorporating a new element, which could be used with a remote ignition device to perform the ignition of the aluminothermic charge. Even then, the possibility to perform the ignition of the aluminothermic using the traditional method will still exist, i.e., using the ignition pistol.

According to all of the above, the process for connecting cables and tubes which makes use of the system described herein is characterized in that it comprises the following steps:

- moving the anchoring mechanism of the system closer to the tube,
- exerting a force F over the mobile piece in order to move it closer to the surface of the tube thus tractioning the spring,
- forcing the magnet to come into contact with the tube's surface,
- entering the end of the cable that will be welded into the mold's opening, and
- pouring aluminothermic powder and ignition powder inside the mold-crucible.

DESCRIPTION OF THE DRAWINGS

To complement the description being made and in order to help better understand the characteristics of the invention, according to a preferred practical embodiment thereof, a set of drawings is attached as an integral part of said description, wherein the following is shown as way of illustration but not limited to.

PREFERRED EMBODIMENT OF THE INVENTION

Figure 1:
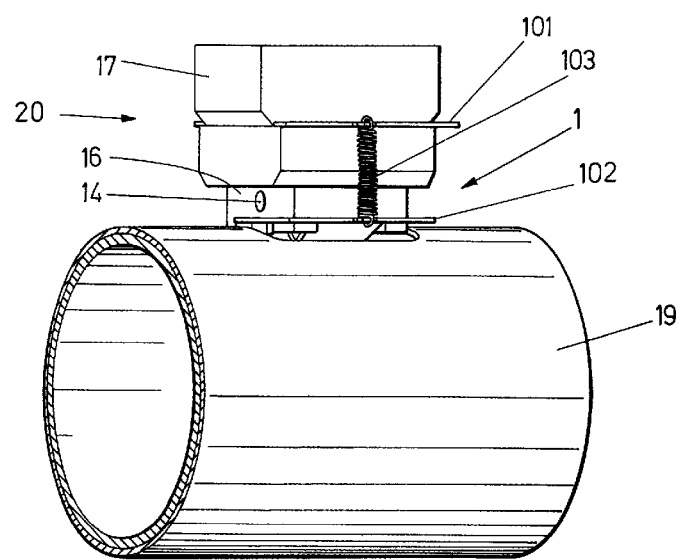
FIG. 1—Shows a perspective view of the mold-crucible that incorporates to the anchoring mechanism of the system object of the invention located over a tube an in an operational position.
Figure 2A:
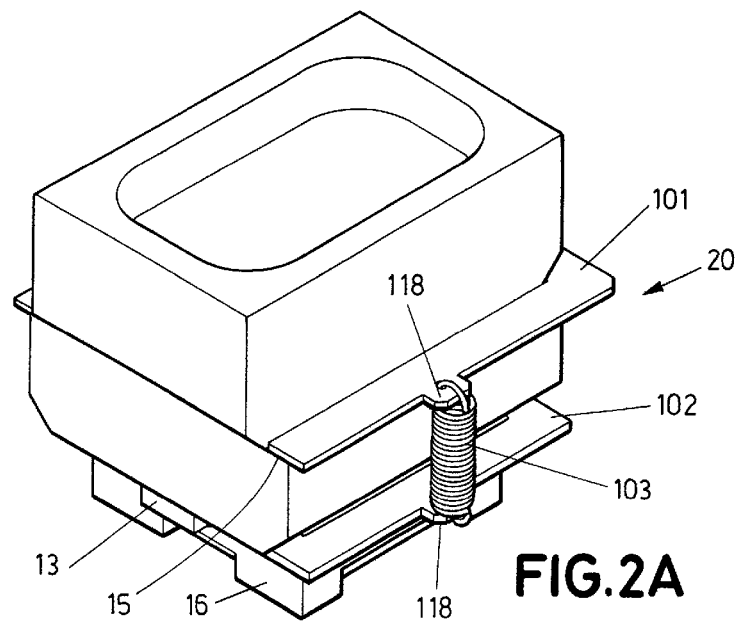
FIGS. 2a and 2b—Show an upper and lower perspective view of the mold-crucible corresponding to FIG. 1.
Figure 2B:
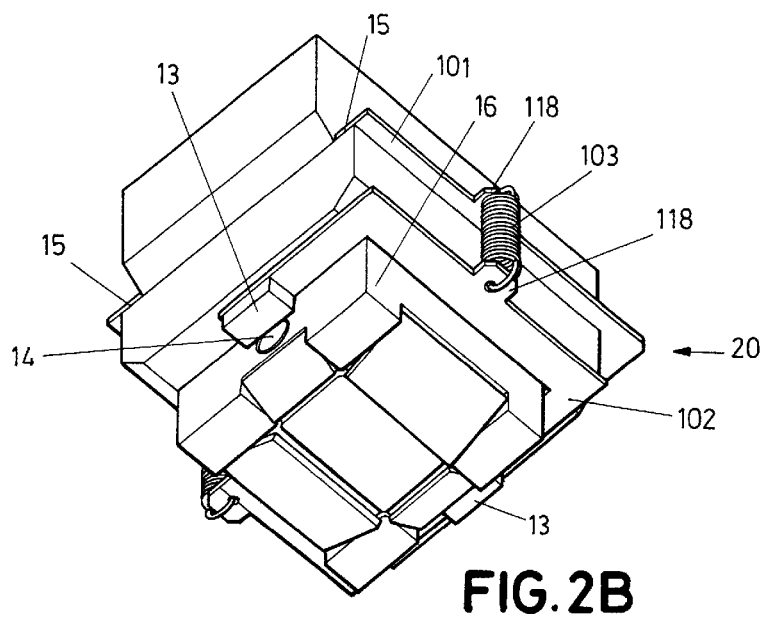

In view of the figures, described below is a preferred embodiment of the system (1) object of this invention.

Represented in FIGS. 1 to 4 is a preferred embodiment of the connection system (1) of cables (18) and tubes (19) object of the invention. The system (1) comprises a mold-crucible set and further comprises:

- an anchoring mechanism (20) adapted to be attached to the surface of the tube (19) which comprises a fixed piece (101) anchored to the mold-crucible set and a mobile piece (102) that is located on the lower part (16) of the mold-crucible set and in whose lower part there is at least one magnet (13), adapted for the creation of a magnetic field to generate a connection force between the surface of the tube (19) and the anchoring mechanism (20), and
- at least a traction spring (103) that extends between the fixed piece (101) and the mobile piece (102).

In the embodiment shown in the figures, the mobile piece (102) and the fixed piece (101) of the anchoring system are made of sheet metal. Specifically, the fixed piece (101) has a "U" shape that is placed on a ledge (15) of the mold-crucible set. Through the ledge (15), the necessary effort is transmitted to the mold-crucible set.

The inner contour of the mobile piece (102) reproduces the outer contour of the lower part (16) of the mold-crucible so the former (16) acts as a guide in the movement of the mobile piece (102). Additionally, the mobile piece (102) is not completely enclosed with respect to the contour of the mold-crucible, but it has an opening to enable the separation of the mold once the welding has been performed.

Both the fixed piece (101) and the mobile piece (102) incorporate, on each of their sides, two earflaps (118) with two holes, through which the anchoring rings of the traction springs (103) are introduced, which extend between both pieces (101, 102). It is through these rings where the springs transmit the anchoring efforts from the mobile piece (102) to the fixed piece (101).

Finally, there are two magnets (13) that are located on the lower part of the mobile piece (102). The position of one of these magnets (13) coincides with the position of the opening (14) of the mold-crucible, while the other magnet (13) is placed on the opposite end. This way of placing the magnets (13) will enable the alignment of the magnets (13) with the contour of the surface of the tube (19). While the magnetic force is enough to attach the two magnets (13) to the lower part of the mobile piece (102), these joints are secured placing some adhesive element between the magnets (13) and the mobile piece (102). It is through these joints where the magnets (13) transmit the anchoring effort from the surface of the tube (19) to the mobile piece (102).

When the anchoring system (1) is in standby, i.e., with the magnets (13) separated from the surface of the tube (19), the upper part of the mobile piece (19) rests over some second ledge (12) that is presented by the mold-crucible. In this position, the two springs (103) are already slightly tractioned, so that there is a small force that presses the fixed piece (101) and the mobile piece (102) against their respective ledge (15, 12) in the mold crucible. This small force ensures that, on standby, the anchoring system (1) is firmly held to the mold-crucible.

The two magnets (13) that the mobile piece (102) of the anchoring system (1) incorporates are aligned with the contour of the surface of the tube (19), making contact with the latter. Regardless of what the tube's (19) diameter is, it will only be over this tube profile where the joint between the anchoring system that incorporates the mold-crucible and the tube (19) itself takes place. This is the reason why this new anchoring system is valid regardless of the tube's (19) diameter.

It is important that the strength of the magnets (13) is large enough to counteract the necessary force needed to traction the springs (103). Otherwise, this traction force of the springs (103) would be enough to separate the mobile piece (102) from the surface of the tube (19), rendering the anchoring system ineffective.

Figures 5, 6:
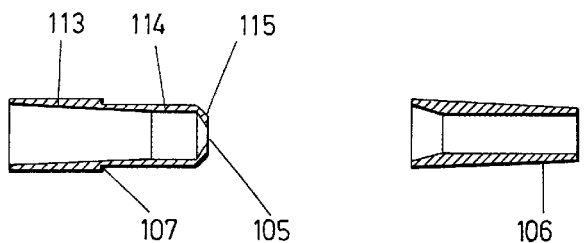
FIG. 5—Shows a section of a bushing that incorporates the mold-crucible according to FIG. 7 for the introduction of the cable with a larger section that may be welded with the system object of the invention.
FIG. 6—Shows a complementary bushing to be inserted into the bushing that incorporates the mold-crucible according to FIG. 7, adapted for the introduction of a cable with a smaller section than the largest that may be welded with the system object of the invention.
Figure 7:
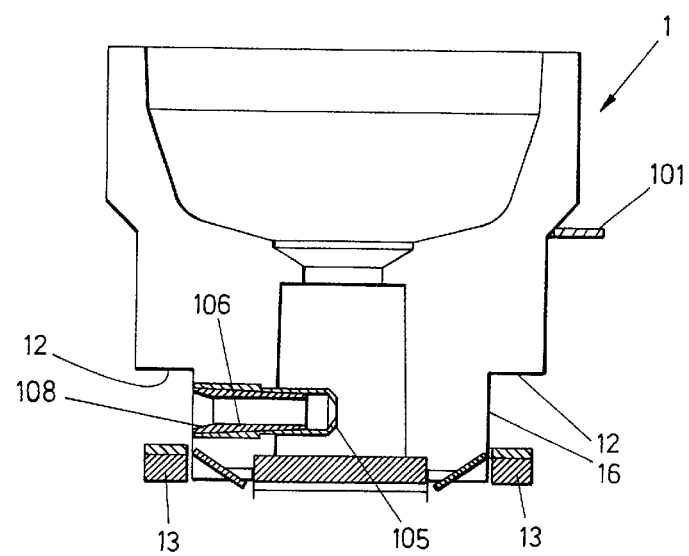
FIG. 7—Shows a section of the mold-crucible that incorporates the bushings corresponding to FIGS. 5 and 6.

In this embodiment, more precisely that of FIGS. 5 to 7, the object of the invention details the welding to a tube (19) of a cable (18) smaller than the largest section cable that may be welded with the system (1) object of the invention; as seen in FIG. 7, where a sectional view of the system's (1) mold-crucible set is shown with a first bushing (105) and a complementary bushing (106) already assembled. The complementary bushing (106) corresponding to another section of cable (18) is seen introduced into the first bushing (105) that incorporates the mold-crucible. This way, the opening (14) initially presented by the mold-crucible set is modified. In view of the cited figure, it appears that, while the assembly of the bushings (105,106) allows to make the welding of a cable (18) smaller than the cable (18) with the largest section that may be welded with the system (1) object of the invention, the total section of the cable (18) plus the bushings (105,106) will not undergo significant modifications from one case to the other. Indeed, in all of the cases, the opening (14) of the mold crucible will be occupied almost in its entirety by copper, either it being from the bushings (105, 106) or from the cable (18). For this reason, the aluminothermic charge will always be the same, regardless of the section of the cable to be welded.

An inner hole of the first bushing (105) that incorporates the mold-crucible has a first inner surface (113) with a small conical feature that will facilitate the introduction of the cable (18) with the largest section that may be welded with the system (1), since this cable (18) will find an input diameter in the first bushing (105) significantly larger than its own diameter. Furthermore, the conical feature of this first inner surface (113) will aid, as will be explained below, in holding some of the complementary bushings (106) corresponding to other sections of the cable (18).

The inner hole of the first bushing (105) that incorporates the mold-crucible has a second inner cylindrical surface (114) with a diameter slightly larger than the diameter of the cable (18) with the largest section that may be welded in the system described herein, so that between the cable (18) and the second inner surface (114) there will be a very small clearance. This rather small clearance will ensure that there are no molten metal leaks coming from the aluminothermic reaction.

The inner hole of the first bushing (105) that incorporates the mold-crucible has a third surface (115) with a significant conical feature that diminishes quickly in diameter, constituting a stop for any cable (18) that is introduced in the bushing (105). The existence of this stop will ensure that no cable (18) is entered deeper than necessary, and this way, if a cable (18) is entered deeper than necessary, it could get in the way between the plate that incorporates the low fusion point alloy and the pouring opening of the metal coming from the aluminothermic reaction, therefore diminishing the fusion of the upper part of this plate, as well as the quantity of the heat transmitted through the plate itself and to the low fusion point alloy.

The exterior surfaces of the first bushing (105) that incorporates the mold-crucible facilitate its assembly in the opening (14) of the mold-crucible. While the aforementioned cylindrical surfaces adjust at the opening (14), a step (107) constitutes a stop which defines up to which point the first bushing (105) is introduced into the mold-crucible.

The complementary bushing(s) (106) correspond to other diameters of cable (18); that is, cables having a diameter smaller than the largest diameter cable capable of being received within the first bushing (105). Prior to use, the complementary bushing (106) must be introduced into the first bushing (105) that incorporates the mold crucible. The exterior surface of the complementary bushing (106) corresponding to another section of the cable (18) also has a small conical feature equal to the one featured on the first inner surface (113) of the first bushing (105) which incorporates the mold crucible. This way, when the complementary bushing (106) is introduced in the former (105), it will be enough to press slightly to attain a conical adjustment between both surfaces, which will guarantee the joint between both bushings (105, 106) due to the high friction force that will appear. For the same reason, the lack of clearance between both bushings (105, 106), will be guaranteed, ensuring that there will be no leakages of molten metal coming from the aluminothermic reaction.

According to what was previously described, in the embodiment shown in the figures, the mold-crucible set incorporates a lid (22) which has a lower part (110) featuring a cavity (112) whose contour reproduces the contour of the fuse (109), so the fuse (109) may be housed in the lower part (110); as well as an upper part (111) that is placed on the lower part (110) so that between both (110, 111) the fuse (109) remains enclosed. In order to ensure the connection between the two parts (110, 111) of the lid (22), and thus ensuring that the fuse (109) does not exit its housing, an adhesive element is used between both parts (110, 111) of the lid (22). It is worth mentioning that once the lid (22) has been assembled, one part of the fuse (109) is placed in a way so that it protrudes from the two parts (110, 111) of the lid (22), so that the fuse (109) may be connected to the remote ignition device.

Likewise, the upper part (111) of the lid (22) features a cavity (116) with a funnel shape, through which a small amount of ignition powder may be poured carelessly so that it ends up in the area surrounding the resistive wire incorporated by the fuse (109). In these conditions, the remote ignition device is ready to be actuated to perform the ignition of that small quantity of ignition powder whose freed energy is transmitted through the central orifice (117) of the upper part (110) of the lid (22) and to the aluminothermic charge contained in the mold's crucible, thus initiating the ignition of the aluminothermic charge.

It is also possible to bring an ignition pistol near the funnel-shaped upper part of the cavity (116) of the upper part (111) of the lid (22), so that the sparks generated by the pistol cause the ignition of that small amount of ignition powder poured carelessly through that funnel-shaped cavity (116). As with the previous case, the energy freed by that small amount of ignition powder will be transmitted through the central orifice (117) of the lower part (110) of the lid (22) and to the aluminothermic charge contained in the crucible of the mold, so that the ignition of this aluminothermic charge will finally take place. That is, the existence of the fuse (19) placed between both parts (110, 111) forming the lid (22) does not prevent the ignition of the charge from taking place in a traditional form, i.e., using the ignition pistol.

Regarding the process to make use of the previously described system (1), firstly, a surface of the tube (19) where the joint with welding is to be made is polished with emery to then bring the mold-crucible that incorporates the system's (1) anchoring mechanism (20) object of the invention closer to the tube (19) formed by a fixed piece (101) made of sheet metal that is anchored to the upper part (17) of the mold-crucible set, a mobile piece (102) made of sheet metal that is placed on a lower part (16) and at least two traction springs (103) designed to elastically connect both sheet metal pieces (101,102) so that the polished surface of the tube (19) is placed in front of the anchoring mechanism (20) to thus actuate said mechanism (20).

Figure 8A:
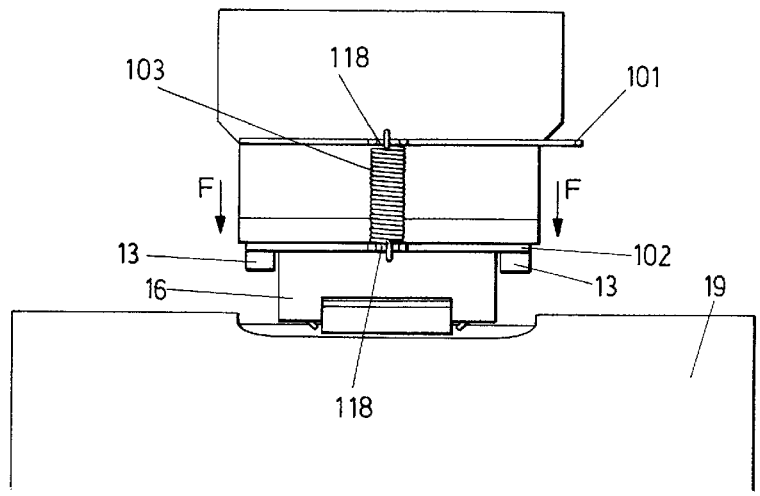
FIGS. 8a and 8b—Shows a schematic view of the actuation maneuver of the anchoring mechanism of the system object of the invention prior to its use.
Figure 8B:
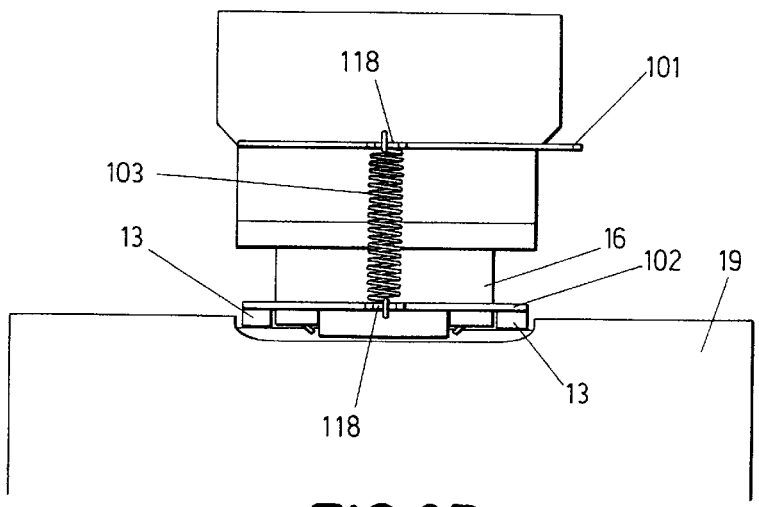
Figure 9:
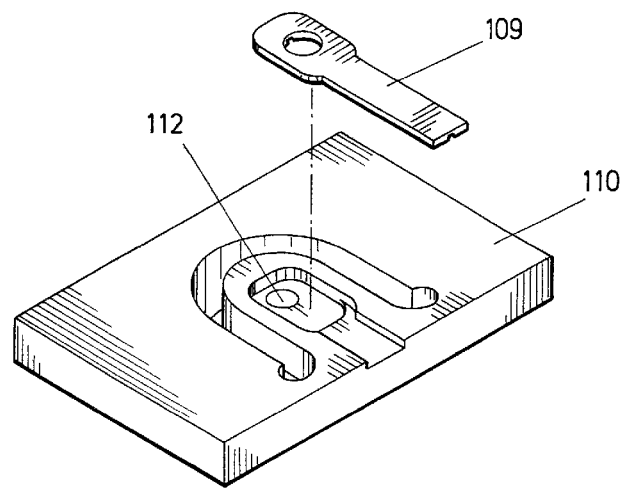
FIG. 9—Shows a perspective view of the lower part of the mold's lid as well as a fuse.
Figure 10:
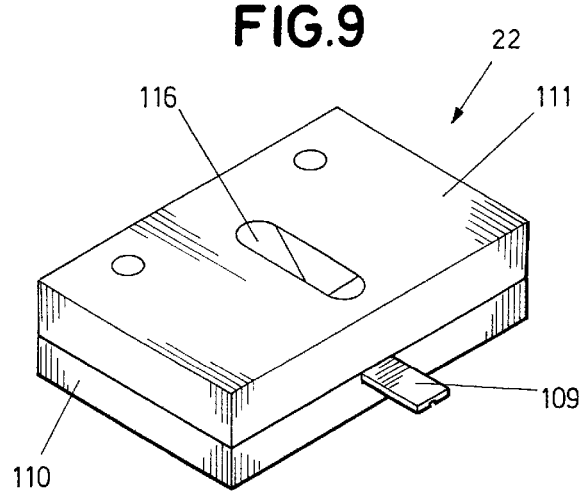
FIG. 10—Shows a perspective view of a full lid with the fuse incorporated.
Figure 11:
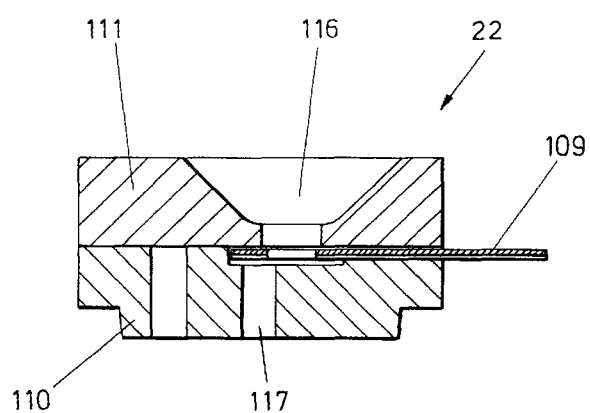
FIG. 11—Shows a section of the lid corresponding to FIG. 10.

While the mold is held tightly against the surface of the tube (19), a force F is applied, see FIGS. 8a and 8b, against the mobile piece (102) in order to bring it closer to the surface of the tube (19). This way, the springs (103) begin to traction. When the mobile piece (102) gets sufficiently close to the surface of the tube (19), the magnets (13) apply the necessary force to hold the set against the tube (19) and with the springs (103) traction.

The traction springs (103) ensure that a constant force is applied on a plate that has the low fusion point alloy incorporated against the steel surface. This force is necessary for the capillarity phenomena to occur which ultimately constitute the joint between the plate and the surface.

Figure 3:
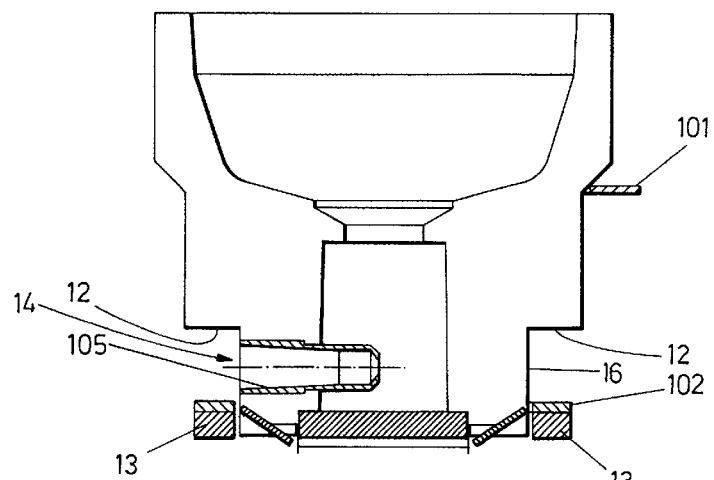
FIG. 3—Shows a section of the mold-crucible that incorporates the anchoring mechanisms corresponding to FIG. 1.

In another embodiment of the object of the invention, illustrated in FIG. 3, to perform the welding, the polyethylene coating is removed and the area of the tube where the welding is to be performed (19) is polished with emery in an area of 80×60 mm, flux is then poured over this polished surface and the system (1) object of the invention is brought closer to it. An F force is applied over the mobile piece (102) in order to bring it closer to the surface of the tube (19) thus driving the springs (103) and finally causing the magnets (13) to come into contact with the surface of the tube (19).

Next, the coating for the end of the cable to be welded is removed to a length of 30 mm. Next, an appropriate complementary bushing (106) is selected, checking that it may be introduced on the end of the cable (18) without coating, and that with the former (106) there is the least clearance possible (this operation is not necessary for the cable (18) with the largest section that may be welded with the system (1)). A complementary bushing (106) that was chosen in the step above is introduced in the first bushing (105) that incorporates the mold, pressing slightly to ensure its position to then introduce the end of the cable (18) without coating into the complementary bushing (106).

Once the cable (18) has been inserted, the aluminothermic powder may be poured into a chute of the mold forming the mold-crucible set, as well as ¾ parts of the ignition powder. In case the reaction is started with a remote ignition device, the end of the fuse (109) that protrudes from the lid (22) may be inserted into the caliper of the remote ignition device and then the lid (22) is placed over the mold, and the remaining ignition powder may be poured into the chute of lid to, subsequently, actuate the push button of the remote ignition device, keeping it pressed until the reaction takes place.

Figure 4A:
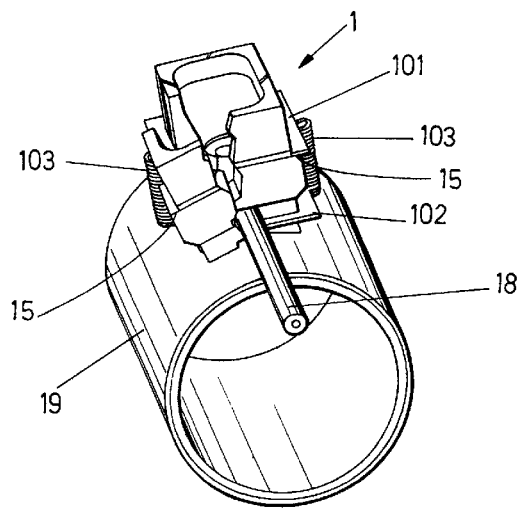
FIGS. 4a and 4b—Show both perspective views of the extraction of the mold-crucible that incorporates to the anchoring mechanism of the system object of the invention after its use.
Figure 4B:
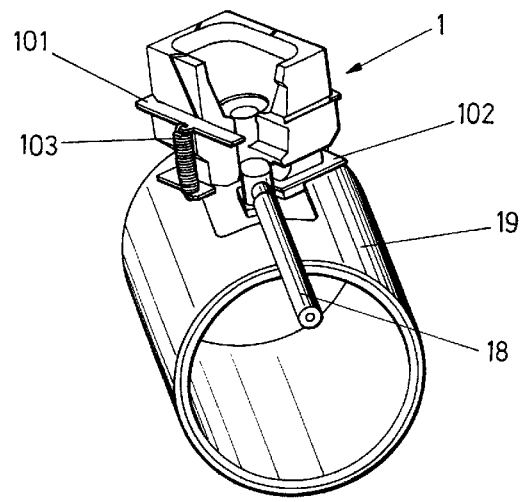

After carefully removing the caliper of the remote ignition device, the mold is left to rest for 15 minutes, to then, with the help of a hammer or similar, break the sand mold through the opening of the mobile piece (102) to separate one corner from the rest of the mold and then move the rest of the mold, freeing the welding, as represented in FIG. 4.

The invention claimed is:

1. A system for connecting cables and tubes, the system comprising:
   a mold-crucible set adapted to provide an aluminothermic reaction therein to generate a connection of a cable to a tube,
   an anchoring mechanism adapted for its attachment to a surface of a tube, the anchoring mechanism comprising:
   a fixed piece anchored to the mold-crucible set;
   a mobile piece located on a lower part of the mold-crucible set;
   at least one magnet located on a lower part of the mobile piece, the at least one magnet adapted to create a magnetic field to generate a connection force between the surface of the tube and the anchoring mechanism; and
   at least one traction spring extending that extends between the fixed piece and the mobile piece.

2. The system of claim 1, wherein the mobile piece and the fixed piece are made of sheet metal.

3. The system of claim 1, wherein the fixed piece has a "U" shape.

4. The system of claim 1, wherein an the inner contour of the mobile piece reproduces an outer contour of the lower part of the mold-crucible, whereby the outer contour of the lower part of the mold-crucible set acts as a guide during movement of the mobile piece.

5. The system of claim 1, wherein two magnets are located on the lower part of the mobile piece.

6. The system of claim 5, wherein both magnets are located on the mobile piece to ensure operational alignment with a contour of the surface of the tube.

7. The system of claim 1, wherein the mold-crucible set comprises an opening, the opening configured to receive a first bushing, the first bushing having an inner hole adapted to allow insertion of the cable.

8. The system of claim 7, wherein the inner hole of the first bushing comprises a first inner surface having a conical feature.

9. The system of claim 7, wherein the inner hole of the first bushing comprises a second inner surface that is cylindrical, the second inner surface configured to have a diameter slightly larger than the diameter of the cable to be welded, thereby allowing the cable to may be introduced into the bushing.

10. The system of one of claim 7, wherein the inner hole of the first bushing comprises a third inner surface having a conical feature diminishing quickly in diameter, the conical feature configured to stop the cable that is introduced into the bushing.

11. The system of claim 7, further comprising a complementary bushing adapted for insertion into the first bushing, whereby the complementary bushing is located between the cable and the first bushing, and wherein an exterior surface of the complementary bushing has a conical feature equal to that comprised by the first inner surface of the first bushing.

12. The system of claim 1, further comprising a lid for the mold-crucible set, the lid comprising a lower part and an upper part, the lower part of the lid comprising a cavity to house a fuse.

13. A process for connecting cables and tubes, the process comprising the steps of:
   placing an anchoring mechanism of a system for connecting cables and tubes near a tube, wherein the said system comprises:
   a mold-crucible set adapted to provide an aluminothermic reaction therein to generate a connection of a cable to a tube,
   an anchoring mechanism adapted for its attachment to a surface of a tube, the anchoring mechanism comprising:
   a fixed piece anchored to the mold-crucible set;
   a mobile piece located on a lower part of the mold-crucible set;
   at least one magnet located on a lower part of the mobile piece, the at least one magnet adapted to create a magnetic field to generate a connection force between the surface of the tube and the anchoring mechanism; and at least one traction spring extending that extends between the fixed piece and the mobile piece;

exerting a force over the mobile piece to bring the mobile piece near the surface of the tube, thereby tractioning the at least one traction spring;

contacting the at least one magnet with the surface of the tube;

introducing an end of the cable to be connected by welding into an opening of the mold-crucible set, the opening configured to receive a first bushing, the first bushing adapted to allow the insertion of the cable;

pouring aluminothermic powder and ignition powder into the mold-crucible set; and welding the cable to the tube upon ignition of the powders.

14. The process of claim 13, further comprising the step of introducing a complementary bushing into the first bushing.

15. The process of claim 13, further comprising the steps of:

inserting and end of a fuse that protrudes from a lid of the mold-crucible set into a connector of a remote ignition device;

placing the lid on the mold-crucible set;

pouring an amount of ignition powder into a chute of the lid;

actuating of the remote ignition device;

removing the lid;

separating a portion of the mold-crucible set from a remainder of the mold-crucible set through an opening of the mobile piece; and moving the remainder of the mold-crucible set, freeing the welding.

* * * * *